(12) United States Patent
Li et al.

(10) Patent No.: US 11,588,732 B2
(45) Date of Patent: Feb. 21, 2023

(54) MESSAGE GENERATION METHOD AND APPARATUS, AND MESSAGE PROCESSING METHOD AND APPARATUS

(71) Applicant: HUAWEI TECHNOLOGIES CO., LTD., Shenzhen (CN)

(72) Inventors: Wenyan Li, Beijing (CN); Haibo Wang, Beijing (CN); Lili Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 17/151,662

(22) Filed: Jan. 19, 2021

(65) Prior Publication Data

US 2021/0226893 A1 Jul. 22, 2021

(30) Foreign Application Priority Data

Jan. 20, 2020 (CN) .......................... 202010066033.1

(51) Int. Cl.
*H04L 45/00* (2022.01)

(52) U.S. Cl.
CPC ................................. *H04L 45/72* (2013.01)

(58) Field of Classification Search
CPC ......... H04L 45/72; H04L 45/74; H04L 45/50; H04L 69/06; H04L 69/22; H04L 45/14; H04L 45/34
See application file for complete search history.

(56) References Cited

U.S. PATENT DOCUMENTS

| 11,245,617 | B1 * | 2/2022 | Bonica | ..................... H04L 45/34 |
| 11,271,849 | B1 * | 3/2022 | Darwish | ................. H04L 45/22 |
| 2020/0351199 | A1 * | 11/2020 | Filsfils | .................. H04L 45/741 |

FOREIGN PATENT DOCUMENTS

| CN | 106411738 A | 2/2017 |
| CN | 109218189 A | 1/2019 |
| CN | 110535766 A | 12/2019 |
| JP | 2018037983 A | 3/2018 |
| JP | 2020127183 A | 8/2020 |
| JP | 2021529481 A | 10/2021 |
| JP | 2021530891 A | 11/2021 |

OTHER PUBLICATIONS

Chinese Office Action dated Nov. 2, 2021 issued in CN Application No. 202010066033.1 (24 pages).

(Continued)

*Primary Examiner* — Hashim S Bhatti

(57) ABSTRACT

This application provides a message generation method, a message processing method, a message generation apparatus, and a message processing apparatus. The message generation method includes: obtaining, by a first device, a segment identifier list SID list, where the SID list includes a plurality of segment identifiers SIDs, the first N bits of the plurality of SIDs are the same, and N is a positive integer; generating, by the first device, a first message based on the SID list, where the first message includes a first part and a second part, the first part includes the first N bits of the plurality of SIDs, and the second part includes bit N+1 to bit 128 of each of the plurality of SIDs; and sending, by the first device, the first message to a second device.

18 Claims, 10 Drawing Sheets

(56) References Cited

OTHER PUBLICATIONS

Z. Li et al., Compressed SRv6 Network Programming draft-li-springcompressed-srv6-np-00, Spring Working Group, Jul. 22, 2019, 15 pages.
S. Previdi et al., Distribution of Traffic Engineering (TE) Policies and State using BGP-LS, draft-ietf-idr-te-lsp-distribution-11, Network Working Group, Internet-Draft, May 2, 2019, total 50 pages.
Request for Comments: 4271, Y. Rekhter, Ed. et al., A Border Gateway Protocol 4 (BGP-4), Network Working Group, Jan. 2006, total 104 pages.
Extended European Search Report dated Jun. 11, 2021 issued in European Application No. 21152226.3 (11 pages).
Official Notice of Rejection dated Jan. 4, 2022 issued in Japanese Patent Application No. 2021-006508 (4 pages) and translation (4 pages).

* cited by examiner

| Sub TLV Type=1205 (SR Segment List) | | Length | ⎫ First sub TLV |
|---|---|---|---|
| Flags | Reserved | | |
| MTID | Algorithm | Reserved | |
| Weight | | | ⎭ |
| Sub TLV Type=1206 (SR Segment sub-TLV) | | Length | ⎫ Second sub TLV |
| Segment Type | Reserved | Flags | |
| SID (16 octets) | | | |
| Segment Descriptor (variable) | | | ⎭ |
| Sub TLV Type=1206 (SR Segment sub-TLV) | | Length | ⎫ Third sub TLV |
| Segment Type | Reserved | Flags | |
| SID (16 octets) | | | |
| Segment Descriptor | | | ⎭ |
| Sub TLV Type=1206 (SR Segment sub-TLV) | | Length | ⎫ Fourth sub TLV |
| Segment Type | Reserved | Flags | |
| SID (16 octets) | | | |
| Segment Descriptor | | | ⎭ |

FIG. 1

| Sub TLV Type=1205 (SR Segment List) || Length ||
|---|---|---|---|
| Flags || Reserved ||
| MTID || Algorithm | Reserved |
| Weight ||||
| Segment list ID (4 octets) ||||
| Sub TLV Type=1206 (SR Segment sub-TLV) || Length ||
| Segment Type | Reserved | Flags ||
| Segment Descriptor ||||
| Sub TLV Type=1206 (SR Segment sub-TLV) || Length ||
| Segment Type | Reserved | Flags ||
| Segment Descriptor ||||
| Sub TLV Type=1206 (SR Segment sub-TLV) || Length ||
| Segment Type | Reserved | Flags ||
| Segment Descriptor ||||

FIG. 6

| Sub TLV Type=1205 (SR Segment List) || Length ||
|---|---|---|---|
| Flags || Reserved ||
| MTID || Algorithm | Reserved |
| Weight ||||
| Sub TLV Type=1206 (SR Segment sub-TLV) || Length ||
| Segment Type | Reserved | Flags ||
| Locator ID (4 octets) ||||
| Func (variable) ||||
| Segment Descriptor ||||
| Sub TLV Type=1206 (SR Segment sub-TLV) || Length ||
| Segment Type | Reserved | Flags ||
| Locator ID (4 octets) ||||
| Func (variable) ||||
| Segment Descriptor ||||
| Sub TLV Type=1206 (SR Segment sub-TLV) || Length ||
| Segment Type | Reserved | Flags ||
| Locator ID (4 octets) ||||
| Func (variable) ||||
| Segment Descriptor ||||

MESSAGE GENERATION METHOD AND APPARATUS, AND MESSAGE PROCESSING METHOD AND APPARATUS

CROSS-REFERENCE TO RELATED APPLICATIONS

This application claims priority to Chinese Patent Application No. 202010066033.1, filed on Jan. 20, 2020, which is hereby incorporated by reference in its entirety.

TECHNICAL FIELD

This application relates to the communications field, and in particular, to a message generation method, a message processing method, a message generation apparatus, and a message processing apparatus.

BACKGROUND

Internet protocol version 6 (IPv6) segment routing (SRv6) is a protocol designed to forward IPv6 packets over a network based on a source routing concept. The protocol defines a forwarding path represented by a segment identifier list (SID list). An SID list includes a plurality of segment identifiers (SID), and each SID represents a node or link on a forwarding path. SIDs that are arranged in order in the SID list may represent nodes or links along the forwarding path.

In an SRv6 network, a controller may calculate an SID list and deliver the SID list to a forwarding device in the network. The forwarding device also needs to report status or policy (policy) information of each SID in the SID list to the controller. Therefore, a message exchanged between the controller and the network forwarding device may need to carry the SID list.

However, currently, the quantity of SID lists carried in a message exchanged between a controller and a headend is limited, and transmission efficiency is low; and when the quantity of SID lists is greater than the quantity of SID lists that can be carried in the message, an SID list may be truncated, and data may be lost, or an excessively long message may be not reported. Consequently, a message transmission failure occurs.

SUMMARY

Embodiments of this application provide a message generation method, a message processing method, a message generation apparatus, and a message processing apparatus, so as to increase the quantity of SID lists that can be carried in a message, thereby improving efficiency and a success rate of message transmission.

According to a first aspect, an embodiment of this application provides a message generation method. The method includes the following steps: First, a first device obtains an SID list, where the SID list includes a plurality of SIDs, the first N bits of the plurality of SIDs are the same, and N is a positive integer. Next, the first device generates a first message based on the SID list, where the first message includes a first part and a second part, the first part includes the first N bits of the plurality of SIDs, and the second part includes bit N+1 to bit 128 of each of the plurality of SIDs. Finally, the first device sends the first message to a second device. After receiving the first message, the second device may obtain each SID based on a common part of the plurality of SIDs in the first message, namely, the first N bits, and bit N+1 to bit 128 of each SID. In this solution, the first message no longer carries 128 bits of each SID in the SID list, but removes a common part from a plurality of SIDs, and stores only the remaining part of each SID, so that the length of the SID list in the message is reduced, and the first message can carry a larger quantity of SID lists than a conventional manner, thereby improving efficiency and a success rate of message transmission.

Optionally, the second part further includes a position indicator indicating a position of the first N bits of the plurality of SIDs in the first part, and the second device may obtain the first N bits of the plurality of SIDs based on the position indicator, and then obtain the SID list based on the first N bits of the plurality of SIDs and bit N+1 to bit 128 of each of the plurality of SIDs, so that the second device obtains a complete SID list.

Optionally, the first part further includes a length of the first N bits, so that the second device can accurately read the first N bits of the SIDs.

According to a second aspect, an embodiment of this application provides a message processing method. The method includes the following steps: First, a second device receives a first message from a first device, where the first message includes a first part and a second part, the first part includes the first N bits of a plurality of SIDs in an SID list, that is, a common part of the plurality of SIDs; and the second part includes bit N+1 to bit 128 of each of the plurality of SIDs, and N is a positive integer. Next, the second device obtains the SID list based on the first part and the second part. Because the message stores only the remaining part of each SID other than the common part, a length occupied by the plurality of SIDs is reduced, so that the first message can carry a larger quantity of SID lists, thereby improving efficiency and a success rate of message transmission.

Optionally, the second part further includes a position indicator indicating a position of the first N bits of the plurality of SIDs in the first part. Then, the second device may obtain the first N bits of the plurality of SIDs based on the position indicator of the first N bits of the plurality of SIDs in the first part, and the second device obtains the SID list based on the first N bits of the plurality of SIDs and bit N+1 to bit 128 of each of the plurality of SIDs, so that the second device obtains a complete SID list.

Optionally, the first part further includes a length of the first N bits, so that the second device can accurately read the first N bits of the SIDs.

According to a third aspect, an embodiment of this application provides a message generation method. The method includes the following steps: First, a first device obtains an SID list identifier. Next, the first device generates a first message, where the first message includes an SID list identifier, where the SID list identifier is used to replace all SIDs in an SID list. Finally, the first device sends the first message to a second device. Because a length of the SID list identifier is less than a sum of lengths of all SIDs in the SID list, the first message can carry a larger quantity of SID lists, thereby improving efficiency and a success rate of message transmission.

Optionally, the method further includes: The first device sends a correspondence to the second device, where the correspondence includes a correspondence between the SID list and the SID list identifier, so that the second device can generate the SID list based on the correspondence and the first message.

According to a fourth aspect, an embodiment of this application provides a message processing method. The method includes the following steps: First, a second device receives a first message from a first device, where the first message includes a segment identifier list SID list identifier. Next, the second device obtains an SID list based on the SID list identifier and a correspondence, where the correspondence includes a correspondence between the SID list and the SID list identifier. In the first message, the SID list identifier is used to replace all SIDs in the SID list, so that a length of the SID list is reduced. In addition, because the second device stores the correspondence between the SID list and the SID list identifier, the second device can obtain the SID list from the first message based on the correspondence, so that the SID list is successfully obtained.

Optionally, the method further includes: The second device receives a correspondence sent by the first device, where the correspondence includes a correspondence between an SID list and an SID list identifier, so that the second device can generate the SID list based on the correspondence and the first message.

According to a fifth aspect, an embodiment of this application provides a message generation method. The method includes the following steps: First, a first device obtains a locator identifier corresponding to each SID in an SID list, where the locator identifier is used to identify a locator part of an SID corresponding to the locator identifier, and a length of the locator identifier is less than a length of the locator part. Next, the first device generates a first message, where the first message includes a locator identifier corresponding to each SID in the SID list and a function part of each SID. Finally, the first device sends the first message to a second device. Because the length of the locator identifier is less than the length of the locator part, a length of the SIDs in the first message is less than 128 bits, so that the length of the SID list is reduced. Therefore, the first message can carry a larger quantity of SID lists, thereby improving efficiency and a success rate of message transmission.

Optionally, the method further includes: The first device sends a correspondence to the second device, where the correspondence includes a correspondence between the locator identifier and the locator part of each SID, so that the second device obtains the SID list based on the correspondence and the first message.

According to a sixth aspect, an embodiment of this application provides a message processing method. The method includes the following steps: First, a second device receives a first message from a first device, where the first message includes a locator identifier corresponding to each SID in an SID list and a function part of the SID, the locator identifier is used to identify a locator part of an SID corresponding to the locator identifier, and a length of the locator identifier is less than a length of the locator part. Next, the second device obtains the locator part of each SID based on the locator identifier corresponding to each SID and a correspondence, where the correspondence includes a correspondence between the locator identifier and the locator part of each SID. Finally, the second device obtains the SID list based on the locator part of each SID and a function part of each SID. Because a length of the locator identifier is less than a length of the locator part, the length of the SIDs carried in the first message is less than 128 bits. This increases the quantity of SID lists carried in the first message, thereby improving efficiency and a success rate of message transmission. In addition, the second device may determine the locator part of the SID corresponding to the locator identifier of the SID carried in the first message based on the correspondence between the locator identifier of the SID and the locator part of the SID, and combine the locator part with the function part in the first message to obtain the SID. In this way, the SID is successfully obtained, and then the SID list is obtained.

Optionally, the method further includes: The second device receives a correspondence from the first device, so as to obtain the SID list based on the correspondence and the first message.

With reference to the embodiments of the first aspect, the third aspect, and the fifth aspect, in a first possible implementation, the first device is a controller, and the second device is a network forwarding device. Then, the message generation method further includes the following step: The first device receives segment description information of at least one of a plurality of SIDs from the second device, where the segment description information is description information of a segment corresponding to the SID, such as information about an algorithm identifier corresponding to the segment. In a second possible implementation, the first device is a network forwarding device, and the second device is a controller. Then, the first message in the message generation method further includes segment description information of at least one of the plurality of SIDs.

With reference to the embodiments of the second aspect, the fourth aspect, and the sixth aspect, in a first possible implementation, the first device is a controller, and the second device is a network forwarding device. Then, the first message in the message generation method further includes segment description information of at least one of the plurality of SIDs. In a second possible implementation, the first device is a network forwarding device, and the second device is a controller. Then, the message generation method further includes the following step: The first device receives segment description information of at least one of a plurality of SIDs from the second device, where the segment description information is description information of a segment corresponding to the SID, such as information about an algorithm identifier corresponding to the segment.

According to a seventh aspect, an embodiment of this application provides a message generation apparatus. The apparatus is applied to a first device, and the apparatus includes: an acquisition unit, configured to obtain a segment identifier list SID list, where the SID list includes a plurality of segment identifiers SIDs, the first N bits of the plurality of SIDs are the same, and N is a positive integer; a generation unit, configured to generate a first message based on the SID list, where the first message includes a first part and a second part, the first part includes the first N bits of the plurality of SIDs, and the second part includes bit N+1 to bit 128 of each of the plurality of SIDs; and a sending unit, configured to send the first message to a second device.

Optionally, the second part further includes a position indicator indicating a position of the first N bits of the plurality of SIDs in the first part.

Optionally, the first part further includes a length of the first N bits.

According to an eighth aspect, an embodiment of this application provides a message processing apparatus. The apparatus is applied to a second device, and the apparatus includes: a receiving unit, configured to receive a first message from a first device, where the first message is used to carry a segment identifier list SID list, the SID list includes a plurality of segment identifiers SIDs, the first N bits of the plurality of SIDs are the same, N is a positive integer, the first message includes a first part and a second part, the first part includes the first N bits of the plurality of SIDs in the segment identifier list SID list, and the second part includes bit N+1 to bit 128 of each of the plurality of SIDs; and an acquisition unit, configured to obtain the SID list based on the first part and the second part.

Optionally, the second part further includes a position indicator of the first N bits of the plurality of SIDs in the first part; and the acquisition unit is configured to: obtain the first N bits of the plurality of SIDs based on the position indicator of the first N bits of the plurality of SIDs in the first part; and obtain the SID list based on the first N bits of the plurality of SIDs and bit N+1 to bit 128 of each of the plurality of SIDs.

Optionally, the first part further includes a length of the first N bits.

According to a ninth aspect, an embodiment of this application provides a message generation apparatus. The apparatus is applied to a first device, and the apparatus includes: an acquisition unit, configured to obtain a segment identifier list SID list identifier, where the SID list identifier corresponds to an SID list; a generation unit, configured to generate a first message, where the first message includes the SID list identifier; and a sending unit, configured to send the first message to a second device.

Optionally, the sending unit is further configured to send a correspondence to the second device, where the correspondence includes a correspondence between the SID list and the SID list identifier.

According to a tenth aspect, an embodiment of this application provides a message processing apparatus. The apparatus is applied to a second device, and the apparatus includes: a receiving unit, configured to receive a first message from a first device, where the first message includes a segment identifier list SID list identifier, and the SID list identifier corresponds to an SID list; and an acquisition unit, configured to obtain the SID list based on the SID list identifier and a correspondence, where the correspondence includes a correspondence between the SID list and the SID list identifier.

Optionally, the receiving unit is further configured to receive a correspondence from the first device.

According to an eleventh aspect, an embodiment of this application provides a message generation apparatus. The apparatus is applied to a first device, and the apparatus includes: an acquisition unit, configured to obtain a locator identifier corresponding to each segment identifier SID in a segment identifier list SID list, where the locator identifier is used to identify a locator part of an SID corresponding to the locator identifier, and a length of the locator identifier is less than a length of the locator part;

a generation unit, configured to generate a first message, where the first message includes a locator identifier corresponding to each SID in the SID list and a function part of each SID; and a sending unit, configured to send the first message to a second device.

Optionally, the sending unit is further configured to send a correspondence to the second device, where the correspondence includes a correspondence between the locator identifier and the locator part of each SID.

According to a twelfth aspect, an embodiment of this application provides a message processing apparatus. The apparatus is applied to a second device, and the apparatus includes: a receiving unit, configured to receive a first message from a first device, where the first message includes a locator identifier corresponding to each segment identifier SID in a segment identifier list SID list and a function part of the SID, the locator identifier is used to identify a locator part of an SID corresponding to the locator identifier, and a length of the locator identifier is less than a length of the locator part; a determining unit, configured to obtain the locator part of each SID based on the locator identifier corresponding to each SID and a correspondence, where the correspondence includes a correspondence between the locator identifier and the locator part of each SID; and an acquisition unit, configured to obtain the SID list based on the locator part of each SID and the function part of each SID.

Optionally, the receiving unit is further configured to receive a correspondence from the first device.

With reference to the embodiments of the seventh aspect, the ninth aspect, and the eleventh aspect, in a first possible implementation, the first device is a controller, and the second device is a network forwarding device. Then, the message generation apparatus further includes a receiving unit, configured to receive segment description information of at least one of a plurality of SIDs from the second device, where the segment description information is description information of a segment corresponding to the SID, such as information about an algorithm identifier corresponding to the segment. In a second possible implementation, the first device is a network forwarding device, and the second device is a controller. Then, the first message in the message generation apparatus further includes segment description information of at least one of the plurality of SIDs.

With reference to the embodiments of the eighth aspect, the tenth aspect, and the twelfth aspect, in a first possible implementation, the first device is a controller, and the second device is a network forwarding device. Then, the first message in the message generation apparatus further includes segment description information of at least one of the plurality of SIDs. In a second possible implementation, the first device is a network forwarding device, and the second device is a controller. Then, the receiving unit in the message generation apparatus is further configured to receive segment description information of at least one of a plurality of SIDs from the second device, where the segment description information is description information of a segment corresponding to the SID, such as information about an algorithm identifier corresponding to the segment.

Further, optionally, the first message may be a border gateway protocol (Border Gateway Protocol, BGP) update message (update message).

According to a thirteenth aspect, an embodiment of this application provides a message processing device. The device includes: a processor and a memory, where the memory is configured to store an instruction; and the processor is configured to execute the instruction in the memory, so as to perform the foregoing message generation method or message processing method.

According to a fourteenth aspect, an embodiment of this application provides a computer-readable storage medium, where the computer-readable storage medium includes an instruction, and when instruction is run on a computer, the computer is enabled to perform the foregoing message generation method or message processing method.

BRIEF DESCRIPTION OF DRAWINGS

FIG. 1 is a schematic diagram of a format of a TLV field carrying an SID list in a conventional message;

FIG. 6 is a schematic diagram of a TLV carrying an SID list identifier in a BGP update message according to an embodiment of this application;

FIG. 8 is a schematic diagram of a TLV carrying an SID list in a BGP update message according to an embodiment of this application;

DESCRIPTION OF EMBODIMENTS

Figure 2:
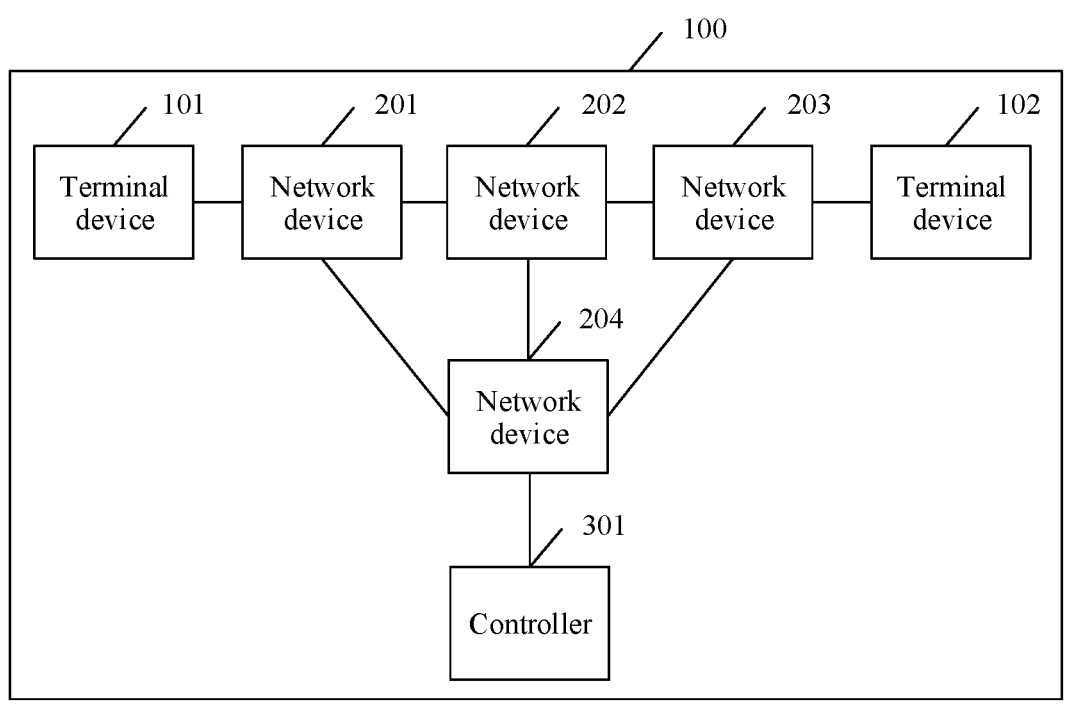
FIG. 2 is a schematic structural diagram of a network system 100 according to an embodiment of this application.

FIG. 1 is a schematic diagram of a format of a type-length-value (type-length-value, TLV) field carrying an SID list in a conventional message. The TLV field includes four sub TLV (sub TLV) fields (the four sub TLV fields are distinguished in FIG. 1 by color depth), where the first sub TLV field is of type 1205, indicating that the sub TLV field is a sub TLV related to an SR segment list; and the last three sub TLV fields are of type 1206, indicating that the sub TLV fields are sub TLVs related to an SR segment.

The first sub TLV field further includes a length (Length) field, a flags (Flags) field, a reserved (Reserved) field, a multi-topology identifier (multi-topology identifier, MTID) field, an algorithm (Algorithm) field, and a weight (Weight) field. The first sub TLV field occupies a total of 16 bytes. The flags field carries attribute information and/or status information of a segment list, for example, whether a path corresponding to an SID list is an explicit path or a dynamic path, or whether all SIDs in an SID list belong to a specific algorithm.

Each of the last three sub TLV fields further includes a length (Length) field, a reserved (Reserved) field, a flags (Flags) field, an SID field, and a segment descriptor (Segment Descriptor) field. Each sub TLV field occupies 25 bytes. The flags field carries attribute information and/or status information of a segment, for example, whether an SID is verified.

In a conventional message, an SID field carries an IPv6 address of a network forwarding device, which is a total of 128 bits. The SID field generally includes a locator (Locator) field and a function (Function) field. For example, for an SID with an IPv6 address of "2000::1::1", the locator field may carry "2000::1", and the function field may carry "::1".

A Locator is an IPv6 network segment under which all IPv6 addresses can be assigned as SRv6 SIDs. After a node configures the Locator, a system generates a Locator network segment route, through which the local node can be located, and all SIDs published by the local node can be reached through the Locator network segment route.

Currently, RFC 4271 specifies that a length of a border gateway protocol message is 4K bytes. Then, when an SID list includes 10 SIDs, if other content of the TLV of the SID list and content of the segment descriptor field in the SID list are not considered, a length of the SID list is 25×10+16=266 bytes, and the message can carry a maximum of 4K/266≈15 SID lists (it is assumed that the SID lists are of the same length). When more than 15 SID lists need to be carried, data exceeding 4K bytes needs to be truncated. Consequently, data loss occurs, or the message is too long to be sent, resulting in a message transmission failure.

To resolve the foregoing technical problem, embodiments of this application provide a message generation method and a message processing method, so as to increase the quantity of SID lists that can be carried in a message, and increase a success rate of message transmission.

For ease of understanding, the following first describes an application scenario of the embodiments of this application.

FIG. 2 is a schematic structural diagram of a network system 100 according to an embodiment of this application. The network system 100 shown in FIG. 2 includes a terminal device 101, a terminal device 102, a network forwarding device 201, a network forwarding device 202, a network forwarding device 203, a network forwarding device 204, and a controller 301. The terminal device 101 is connected to the network forwarding device 201; the network forwarding device 201 is connected to the network forwarding device 202; the network forwarding device 202 is connected to the network forwarding device 203; the network forwarding device 203 is connected to the terminal device 102; the network forwarding device 204 is connected to the network forwarding device 201, the network forwarding device 202, and the network forwarding device 203; and the controller 301 is connected to the network forwarding device 204.

Each of the terminal device 101 and the terminal device 102 may also be referred to as user equipment (user equipment, UE), a mobile station (mobile station, MS), a mobile terminal (mobile terminal, MT), a terminal, or the like, and is a device for providing voice and/or data connectivity to a user, or a chip disposed in the device, for example, a handheld device or a vehicle-mounted device having a wireless connection function. Currently, some examples of the terminal device include a mobile phone, a desktop computer, a tablet computer, a notebook computer, a palmtop computer, a mobile internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), and a home gateway device supporting 5G access (5G-residential gateway, 5G-RG).

Each of the network forwarding device 201, the network forwarding device 202, and the network forwarding device 203 may be a forwarding device such as a router (router) or a switch (switch).

The network forwarding device 204 is, for example, a route reflector (Route Reflector, RR).

The controller 301 may be, for example, a software-defined networking (Software Defined Network, SDN) controller.

In this embodiment of this application, the controller 301 may obtain topology information of the network forwarding device 201, the network forwarding device 202, and the network forwarding device 203 by using the network forwarding device 204, generate an SID list indicating a forwarding path based on the topology information, and send a first BGP update message to the network forwarding device 201 by using the network forwarding device 204, where the first BGP update message carries the information indicating the SID list, and SIDs included in the SID list represent the network forwarding device 201, the network forwarding device 202, and the network forwarding device 203, respectively, and the SID list is used to transmit a message to the terminal device 102 for the terminal device 101.

After receiving the first BGP update message, the network forwarding device 201 forwards the message based on a path indicated by the SID list in the first BGP update message.

In addition, the network forwarding device 201 may generate a second BGP update message, and send the message to the controller by using the network forwarding device 204, where the second BGP update message carries information representing an SID list and segment description information, and the segment description information may be carried in the segment descriptor field of the second BGP update message. The segment description information may include, for example, information about an algorithm identifier, where the algorithm identifier may be used to perform network fragmentation. The segment description information may also include, for example, information about a network forwarding device and/or status information of a tunnel between network forwarding devices, where the information about a network forwarding device includes, for example, a BGP router identifier (BGP router ID), an autonomous system number (Autonomous System Number), and an endpoint (Endpoint). The status information of a tunnel is information indicating a status of the tunnel, for example, an active (UP) state, or a failed (Down) state.

The network forwarding device 204 may transparently transmit the BGP update message between the controller 301 and the network forwarding device 201, or may parse a received BGP update message and then generate a new BGP update message for sending. A parsing process includes converting a message representing an SID list in the BGP update message to the SID list. A process of generating a new BGP update message includes converting an SID list to a message representing the SID list.

Certainly, it can be understood that in actual application, the network system 100 may not include the network forwarding device 204; that is, the controller is directly connected to the network forwarding device 201 to the network forwarding device 203. For example, the controller 301 may obtain topology information of the network forwarding device 201, the network forwarding device 202, and the network forwarding device 203 directly without using the network forwarding device 204.

Figure 3:
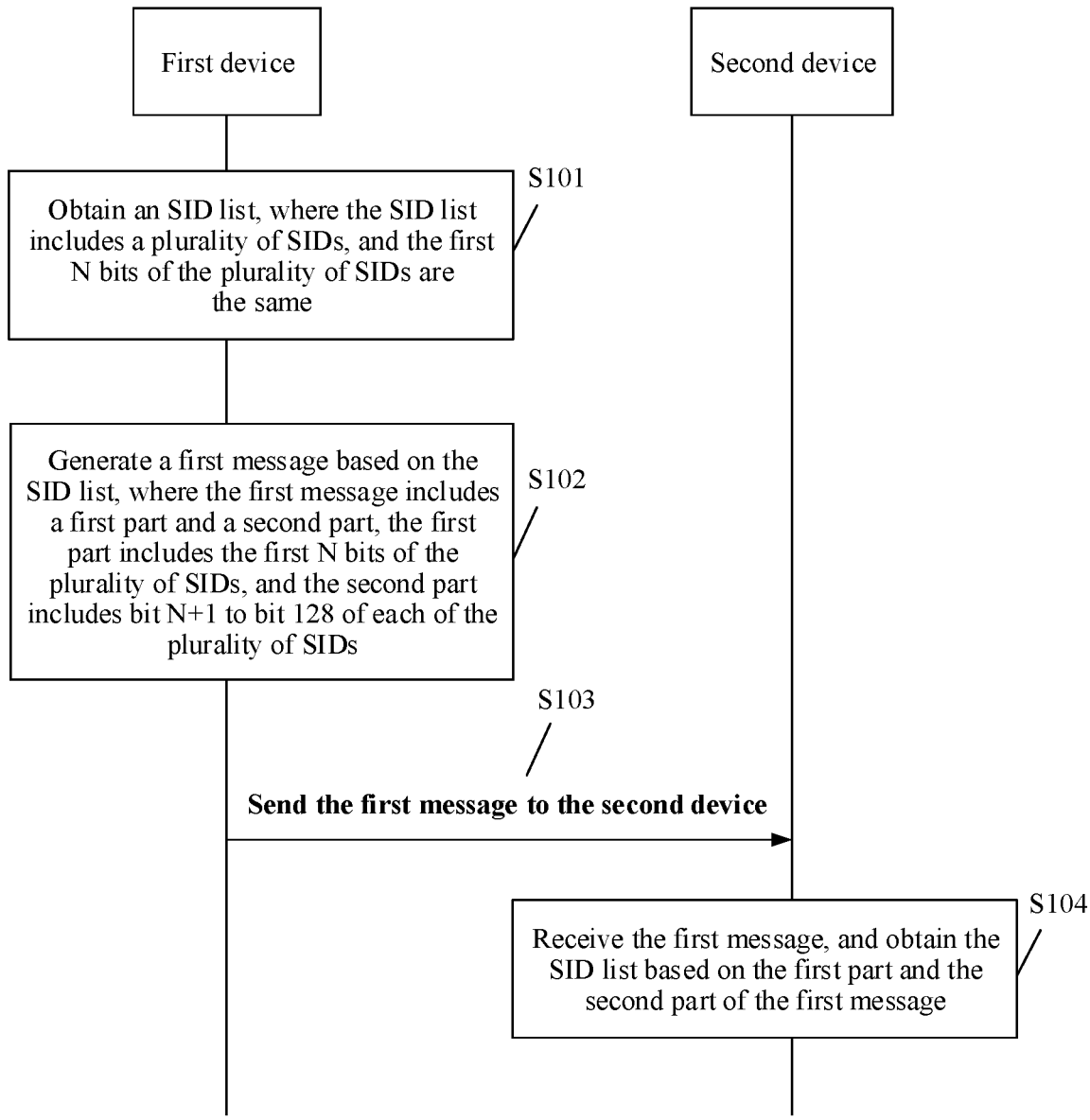
FIG. 3 is a schematic flowchart of a message generation method according to an embodiment of this application.

FIG. 3 is a schematic flowchart of a message generation method according to an embodiment of this application.

The following describes the message generation method provided in this embodiment of this application with reference to FIG. 2 and FIG. 3. The method includes the following steps:

S101: A first device obtains an SID list, where the SID list includes a plurality of SIDs, and the first N bits of the plurality of SIDs are the same.

In this embodiment of this application, the first device may be, for example, the controller 301 in the embodiment shown in FIG. 2, and a second device mentioned below may be, for example, the network forwarding device 201 in the embodiment shown in FIG. 2. Alternatively, the first device may be, for example, the network forwarding device 201 in the embodiment shown in FIG. 2, and the second device mentioned below may be the controller 301 in the embodiment shown in FIG. 2. Alternatively, the first device may be, for example, the network forwarding device 201 in the embodiment shown in FIG. 2, and the second device may be, for example, the network forwarding device 204 in the embodiment shown in FIG. 2. Alternatively, the first device may be, for example, the network forwarding device 204 in the embodiment shown in FIG. 2, and the second device may be, for example, the network forwarding device 201 in the embodiment shown in FIG. 2.

In this embodiment of this application, an SID includes a locator part and a function part, and the locator part and the function part occupy a total of 128 bits. The first N bits are counted from the first bit of the locator part of the SID, and N is an integer greater than or equal to 1 and less than 128. In this embodiment of this application, the first N bits of an SID refer to content of the first N bits of the SID.

In this embodiment of this application, the first device obtains an SID list, where the first N bits of all of the plurality of SIDs included in the SID list are the same.

For example, Table 1 shows a plurality of SIDs included in the SID list obtained by the first device.

TABLE 1

| SID list1 | SID1 | 2000::1::1 |
| | SID2 | 2000::2::1 |
| | SID3 | 2000::3::1 |
| SID list2 | SID4 | 2001::1::1 |
| | SID5 | 2001::2::1 |

In Table 1, SID list1 includes SID1, SID2, and SID3, where SID1 is "2000::1::1", SID2 is "2000::2::1", and SID3 is "2000::3::1". The first 120 bits of the three SIDs are the same and are "2000::".

In Table 1, SID list2 includes SID4 and SID5, where SID4 is "2001::1::1", and SID5 is "2001::2::1". The first 96 bits of the two SIDs are the same and are "2001::".

It should be noted that, that the first N bits of the plurality of SIDs are the same does not mean that bits N+1 of the plurality of SIDs are different. That is, it is assumed that the first M bits of the plurality of SIDs are the same but bits M+1 of the plurality of SIDs are different. Then, N is greater than or equal to 1 and less than or equal to M.

S102: The first device generates a first message based on the SID list, where the first message includes a first part and a second part, the first part includes the first N bits of the plurality of SIDs, and the second part includes bit N+1 to bit 128 of each of the plurality of SIDs.

In this embodiment of this application, bit N+1 to bit 128 of an SID refer to content of bit N+1 to bit 128 of the SID.

In this embodiment of this application, the first message is, for example, the first BGP update message or the second BGP update message in the embodiment shown in FIG. 2. The first part and the second part in the first message may be one of the foregoing implementations of representing an SID list.

Figure 4:
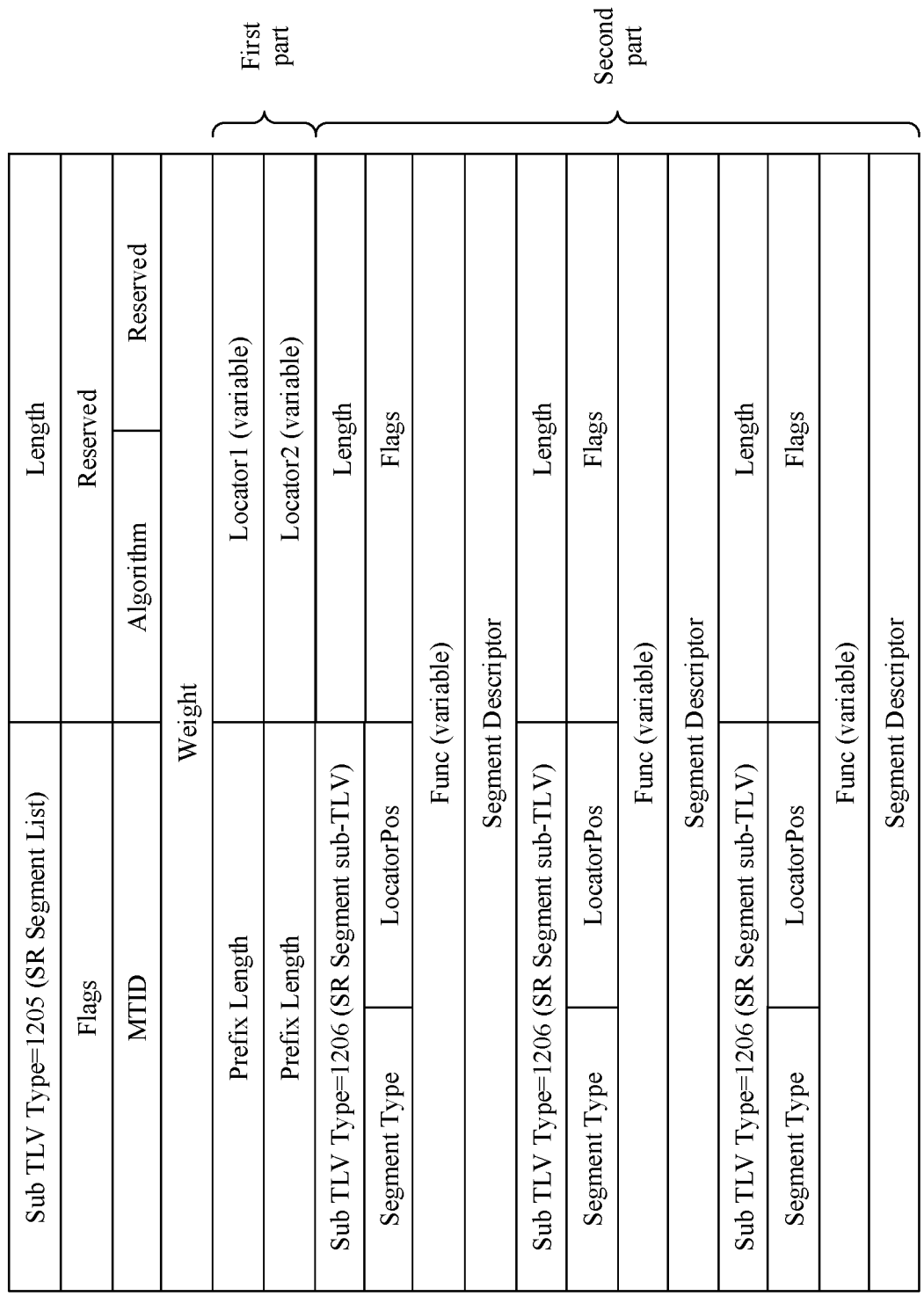
FIG. 4 is a schematic diagram of a TLV carrying an SID list in a BGP update message according to an embodiment of this application.

FIG. 4 is a schematic diagram of a TLV carrying an SID list in a BGP update message according to an embodiment of this application.

In FIG. 4, the first N bits of the plurality of SIDs are carried in the locator field as a common part of the plurality of SIDs, and are placed before the SID list. Certainly, it can be understood that the common part may alternatively be placed at another position in the first message. This is not specifically limited in this application. The remaining parts of the plurality of SIDs, that is, bit N+1 to bit 128, are carried in the function (Func for short) field of each sub TLV. It can also be understood that the foregoing locator field and Func field are not intended to limit names of fields carrying the first part and the second part, and persons skilled in the art may also design the locator field and the Func field based on an actual situation. If the first message carries a plurality of SID lists, the common parts of all of the plurality of SID lists may be placed together, for example, be placed before the first SID list, or the common part of each SID list may be placed before the respective SID list, and so on. This is not specifically limited in this embodiment of this application.

In this embodiment of this application, the first part (marked in light gray in FIG. 4) may include a length of the first N bits in addition to the first N bits of a plurality of SIDs. For example, in FIG. 4, the length of the first N bits is carried in a prefix length (Prefix Length) field and is placed before an SID list together with a locator field. Each locator field corresponds to one prefix length field. Certainly, the name and position of the prefix length field are not intended to limit the technical solution of this application, and persons skilled in the art may also design the prefix length field based on an actual situation.

In this embodiment of this application, the second part (marked in dark gray in FIG. 4) may include a position indicator in addition to the remaining part of each of the plurality of SIDs, where the position indicator indicates the position of the first N bits of the plurality of SIDs in the first message. For example, in FIG. 4, the position indicator is carried in a Locator Position (LocatorPos for short) field of the sub TLV of each SID, and each locator field corresponds to one LocatorPos field. It can be understood that the name and position of the LocatorPos field in FIG. 4 are not intended to limit the technical solution of this application, and persons skilled in the art may design the LocatorPos field based on an actual situation.

With reference to Table 1 and FIG. 4, the first message may include two locator fields: a locator field 1 and a locator field 2, where the locator field 1 carries the first N bits of "2000::" of SID list1, and locator field 2 carries the first N bits of "2001::" of SID list2. A value of a prefix length field corresponding to the locator field 1 is 120, and a value of a prefix length field corresponding to the locator field 2 is 100.

A value of the LocatorPos field included in SID1 in SID list1 is 1, which indicates a position of the locator field 1; and a value of the Func field included in SID1 is "1::1".

A value of the LocatorPos field included in SID2 in SID list1 is 1, which indicates a position of the locator field 1; and a value of the Func field included in SID1 is "2::1".

A value of the LocatorPos field included in SID3 in SID list1 is 1, which indicates a position of the locator field 1; and a value of the Func field included in SID1 is "3::1".

A value of the LocatorPos field included in SID4 in SID list2 is 2, which indicates a position of the locator field 2; and a value of the Func field included in SID1 is "::1::1".

A value of the LocatorPos field included in SID5 in SID list2 is 2, which indicates a position of the locator field 2; and a value of the Func field included in SID1 is "::2::1".

S103: The first device sends the first message to the second device.

S104: The second device receives the first message, and obtains the SID list based on the first part and the second part of the first message.

In this embodiment of this application, because the first part includes the first N bits of the plurality of SIDs in the SID list, and the second part includes bit N+1 to bit 128 of each of the plurality of SIDs, each of the plurality of SIDs may be obtained by combining the first N bits and bit N+1 to bit 128. After obtaining the plurality of SIDs included in the SID list, the SID list is generated based on a sequence of the plurality of SIDs in the first message.

If the second part further includes the position indicator of the first N bits of the plurality of SIDs in the first part, the second device may obtain the first N bits of the plurality of SIDs based on the position indicator, then obtain the plurality of SIDs based on the first N bits of the plurality of SIDs and bit N+1 to bit 128 of each of the plurality of SIDs, and then obtain the SID list based on the sequence of the plurality of SIDs in the first message.

For example, the first device may obtain the value "2000::" of the locator field 1 based on the value "1" of the LocatorPos field included in SID1, and obtain the value "2000::1::1" of SID1 by combining content of the locator field and content of the Func field based on the value "1::1" of the Func field included in SID1.

For another example, the first device obtains the value "2001::" of the locator field 2 based on the value "2" of the LocatorPos field included in SID3, and obtains the value "2001::1::1" of SID3 by combining content of the locator field and content of the Func field based on the value "::1::1" of the Func field included in SID3.

In this embodiment of this application, the first N bits of the plurality of SIDs are extracted and separately carried in a field as a common part. This differs from a conventional manner in which each SID includes 128 bits, so that a length occupied by the SID list in the first message is reduced as compared with the conventional manner, and the first message can carry a larger quantity of SID lists than in the conventional manner, thereby improving efficiency and a success rate of message transmission.

For example, it is assumed that one SID list includes 10 SIDs, the first 15 bytes (that is, 120 bits) of all SIDs are the same, and the last byte of each SID is different from the last byte of any other SID. The prefix length field occupies one byte, and then, the length of the SID list is 10×10+15+16+1=132 bytes; and a message with a message length of 4K bytes can carry a maximum of 4K/132≈30 SID lists (it is assumed that all SID lists are of the same length). As mentioned above, only a maximum of 15 SID lists can be carried in the conventional manner. Therefore, the first message in this embodiment of this application can carry a larger quantity of SID lists than in the conventional manner, thereby improving efficiency of message transmission, reducing a risk that the message is truncated or not sent, and improving a success rate of message transmission.

Figure 5:
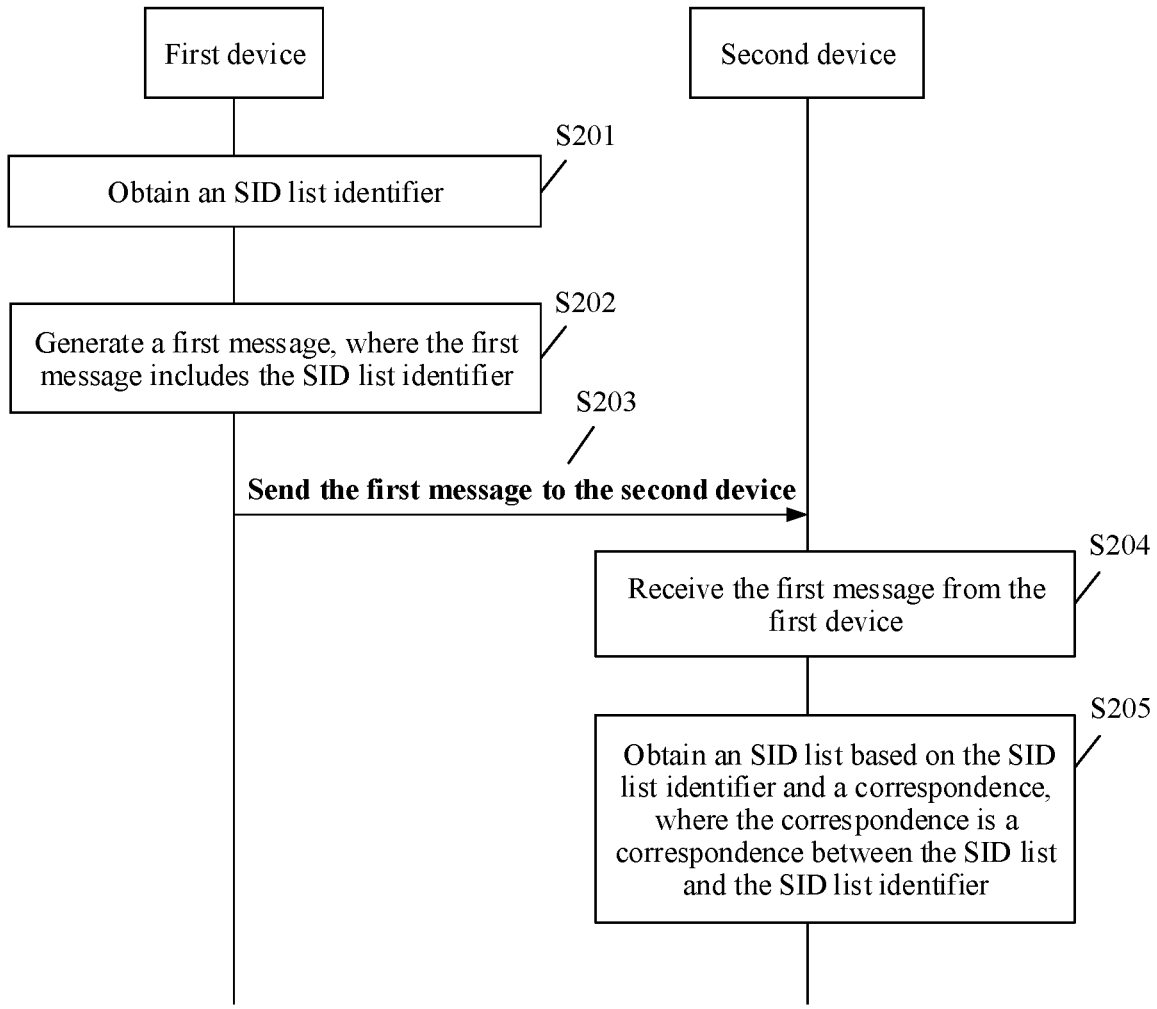
FIG. 5 is another flowchart of a message generation method according to an embodiment of this application.

FIG. 5 is another flowchart of a message generation method according to an embodiment of this application.

The following describes the message generation method provided in this embodiment of this application with reference to FIG. 2 and FIG. 5. The method includes the following steps:

S201: A first device obtains an SID list identifier.

In this embodiment of this application, the first device may be, for example, the controller 301 in the embodiment shown in FIG. 2, and a second device mentioned below may be, for example, the network forwarding device 201 in the embodiment shown in FIG. 2. Alternatively, the first device may be, for example, the network forwarding device 201 in the embodiment shown in FIG. 2, and the second device mentioned below may be the controller 301 in the embodiment shown in FIG. 2. Alternatively, the first device may be, for example, the network forwarding device 201 in the embodiment shown in FIG. 2, and the second device may be, for example, the network forwarding device 204 in the embodiment shown in FIG. 2. Alternatively, the first device may be, for example, the network forwarding device 204 in the embodiment shown in FIG. 2, and the second device may be, for example, the network forwarding device 201 in the embodiment shown in FIG. 2.

When the first device is a controller, the first device may generate a corresponding identifier for the SID list. When the first device is a network forwarding device, the controller may deliver a correspondence between the SID list and the SID list identifier to the network forwarding device in advance, so that the network forwarding device obtains the SID list identifier.

For example, Table 2 shows correspondences between an SID list and an SID list identifier.

TABLE 2

| SID list identifier A | SID1 |
| | SID2 |
| | SID3 |
| SID list identifier B | SID4 |
| | SID5 |

In Table 2, an SID list identifier A is an SID list identifier including SID1, SID2, and SID3; and an SID list identifier B is an SID list identifier including SID4 and SID5.

In this embodiment of this application, the SID list identifier may be a character, a number, or the like. This is not specifically limited in this embodiment of this application.

S202: The first device generates a first message, where the first message includes the SID list identifier.

In this embodiment of this application, the first message is, for example, the first BGP update message or the second BGP update message in the embodiment shown in FIG. 2.

FIG. 6 is a schematic diagram of a TLV carrying an SID list identifier (ID) in a BGP update message according to an embodiment of this application.

In FIG. 6, the TLV includes an SID list ID field, where the SID list ID field may occupy four bytes. Each SID list ID field may be placed before a sub TLV that is used to carry the segment descriptor field of each SID included in the SID list, so as to indicate that the sub TLV corresponding to the SID list ID carried in the SID list ID field is placed after the SID list ID field. Correspondingly, the sub TLV in FIG. 6 reduces the quantity of SID fields carrying the SID, and therefore the quantity of bytes of the entire SID list is reduced. Certainly, it can be understood that FIG. 6 does not limit the position of the SID list ID field in the first message; and persons skilled in the art may also design the position of SID list ID field based on an actual situation.

With reference to Table 2 and FIG. 6, the first message may include two SID list ID fields: an SID list ID field 1 and an SID list ID field 2. The SID list ID field 1 carries an SID list identifier A; and the SID list ID field 2 carries an SID list identifier B. The SID list identifier A includes three sub TLVs, where the three sub TLVs include the segment descriptor fields of SID1, SID2, and SID3, respectively. The SID list identifier B includes two sub TLVs, where the two sub TLVs include the segment descriptor fields of SID4 and SID5, respectively. Each SID list ID field may be placed before or after the corresponding sub TLV in the first message. This is not specifically limited in this embodiment of this application.

It should be noted that the sub TLVs corresponding to the SID lists may be arranged in the order of the SIDs in the SID lists, so that the second device can accurately find a sub TLV corresponding to an SID.

S203: The first device sends a first message to the second device.

S204: The second device receives the first message from the first device.

S205: The second device obtains the SID list based on the SID list identifier and a correspondence, where the correspondence includes a correspondence between the SID list and the SID list identifier.

In this embodiment of this application, the second device obtains the correspondence between the SID list and the SID list identifier in advance, and obtains the SID list based on the SID list identifier and the correspondence after receiving the first message.

For example, the second device obtains an SID list including SID1, SID2 and SID3 based on Table 2 and the SID list identifier A in the SID list ID field 1 in the first message. After obtaining the SID list, the second device may obtain the sub TLVs corresponding to the SID list identifier A in the first message, so as to extract values of the segment descriptor fields from the sub TLVs. Because the sub TLVs corresponding to the SID list identifier A are arranged in the order of the SIDs in SID list1, the values of the segment descriptor fields extracted by the first device from all sub TLVs based on the order of the sub TLVs can correspond to the SIDs included in the SID list.

In this embodiment of this application, because the SID list identifier is used to replace a plurality of SIDs included in the SID list, the length of the SID list identifier is less than the length of the plurality of SIDs included in the SID list, so that the length of the SID list is reduced, and the first message can carry a larger quantity of SID lists.

For example, it is assumed that one SID list includes 10 SIDs, and the SID list ID field in the first message occupies four bytes. Then, the length of the SID list is 9×10+16+4=110 bytes, and a message with a message length of 4K bytes can carry a maximum of 4K/110≈36 SID lists (it is assumed that the SID lists are of the same length). As mentioned above, only a maximum of 15 SID lists can be carried in the conventional manner. Therefore, the first message in this embodiment of this application can carry a larger quantity of SID lists than in the conventional manner, thereby reducing a risk that the message is truncated or not sent, and improving efficiency and a success rate of message transmission.

Figure 7:
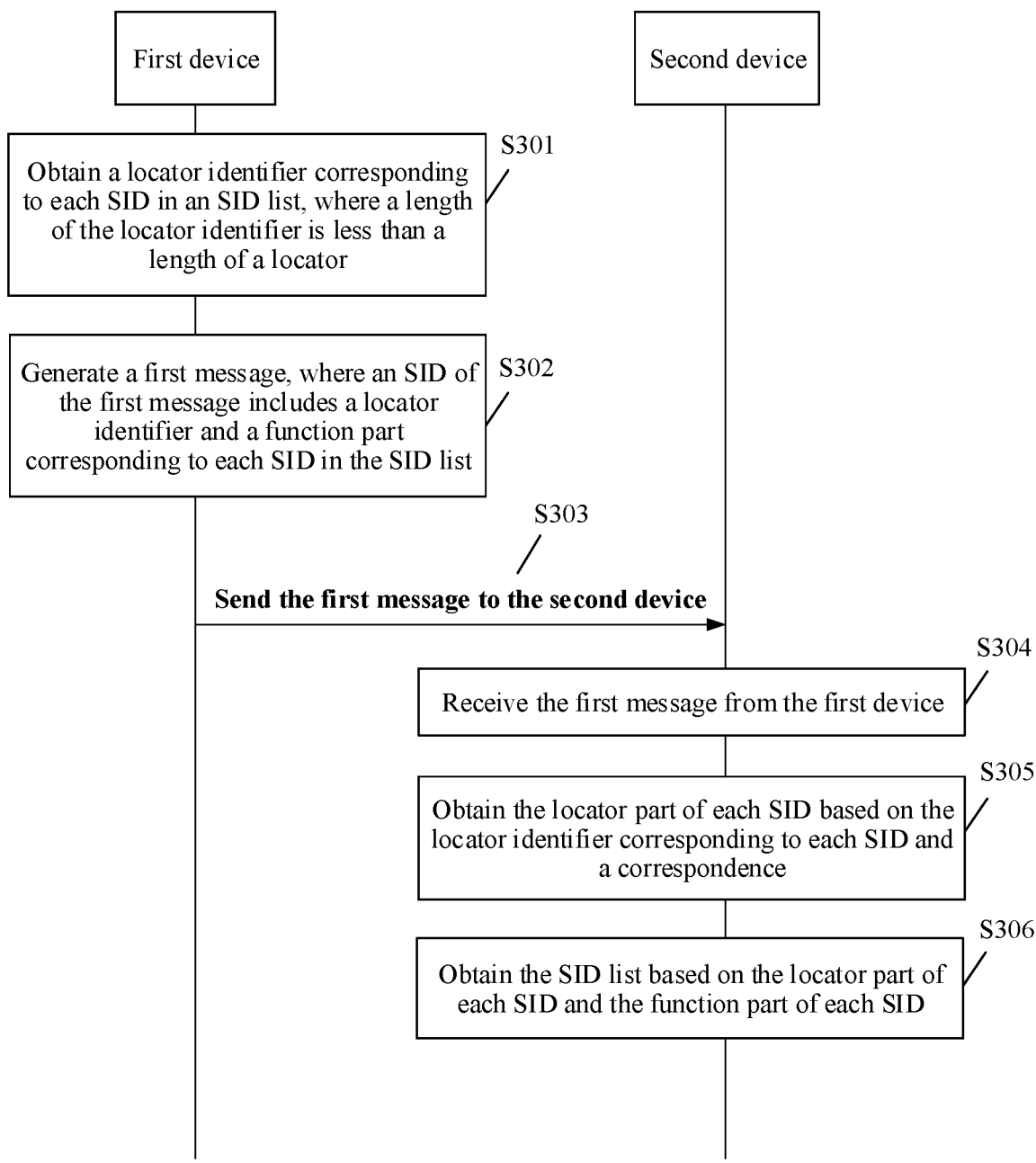
FIG. 7 is another flowchart of a message generation method according to an embodiment of this application.

FIG. 7 is another flowchart of a message generation method according to an embodiment of this application.

The following describes the message generation method provided in this embodiment of this application with reference to FIG. 2 and FIG. 7. The method includes the following steps:

S301: A first device obtains a locator identifier corresponding to each SID in an SID list, where a length of the locator identifier is less than a length of a locator.

In this embodiment of this application, the locator identifier is used to identify the locator part of an SID in the SID list.

In this embodiment of this application, the first device may be, for example, the controller 301 in the embodiment shown in FIG. 2, and a second device mentioned below may be, for example, the network forwarding device 201 in the embodiment shown in FIG. 2. Alternatively, the first device may be, for example, the network forwarding device 201 in the embodiment shown in FIG. 2, and the second device mentioned below may be the controller 301 in the embodiment shown in FIG. 2. Alternatively, the first device may be, for example, the network forwarding device 201 in the embodiment shown in FIG. 2, and the second device may be, for example, the network forwarding device 204 in the embodiment shown in FIG. 2. Alternatively, the first device may be, for example, the network forwarding device 204 in the embodiment shown in FIG. 2, and the second device may be, for example, the network forwarding device 201 in the embodiment shown in FIG. 2.

In this embodiment of this application, when the first device is a controller, the first device may generate a corresponding identifier for the locator part of an SID, or may obtain the locator identifier assigned by the network forwarding device corresponding to the SID. In the latter case, each network forwarding device pre-assigns its own locator identifier, then sends a correspondence between the locator part and the locator identifier to a headend (in FIG. 1, the headend is the network forwarding device 201) through flooding; and then the headend reports the received correspondence between the locator part and the locator identifier from each network forwarding device to the controller. Alternatively, each network forwarding device may directly send the correspondence between its own locator part and the locator identifier to the controller.

When the first device is a network forwarding device, the first device may receive the correspondence between the locator identifier and the locator part of the SID that are pre-configured for each network forwarding device, or may receive the correspondence delivered by the controller. This is not specifically limited in this embodiment of this application.

Table 3 shows an example of the correspondence between the locator part and the locator identifier (ID).

TABLE 3

| SID list | Locator part | Locator ID |
|----------|--------------|------------|
| SID1 | 2000::1 | A |
| SID2 | 2000::2 | B |
| SID3 | 2000::3 | C |

In this embodiment of this application, the locator identifier may be a character, a number, or the like. This is not specifically limited in this embodiment of this application.

S302: The first device generates a first message, where the first message includes a locator identifier and a function part corresponding to each SID in the SID list.

In this embodiment of this application, the first message is, for example, the first BGP update message or the second BGP update message in the embodiment shown in FIG. 2.

In this embodiment of this application, the first device may generate the first message after obtaining the locator identifier of the SID included in the SID list. The first message may include a first field and a second field, where the first field carries the locator identifier of the SID, and the second field carries the function part of the SID.

FIG. 8 is a schematic diagram of a TLV carrying an SID list in a BGP update message according to an embodiment of this application. In FIG. 8, the first field is a locator ID field (marked in light gray in FIG. 8), which occupies four bytes; and the second field is a function (func) field (marked in dark gray in FIG. 8).

With reference to Table 3 and FIG. 8, a value of the locator ID field included in a sub TLV corresponding to SID1 is 1, and a value of the func field is "::1"; a value of the locator ID field included in a sub TLV corresponding to SID2 is 2, and a value of the func field is "::1"; and a value of the locator ID field included in a sub TLV corresponding to SID3 is 3, and a value of the func field is "::1".

S303: The first device sends the first message to the second device.

S304: The second device receives the first message from the first device.

S305: The second device obtains the locator part of each SID based on the locator identifier corresponding to each SID and a correspondence.

S306: The second device obtains the SID list based on the locator part of each SID and the function part of each SID.

After obtaining the locator part and the function part of an SID, the SID can be obtained by placing the function part after the locator part.

For example, the second device obtains "2000::1" of the locator part based on Table 3 and the value "1" of the locator ID field corresponding to SID1 in the first message, and then obtains "2000::1::1" of SID1 based on the value "::1" of the func field corresponding to SID1; the second device obtains "2000::2" of the locator part based on Table 3 and the value "2" of the locator ID field corresponding to SID2 in the first message, and then obtains "2000::2::1" of SID2 based on the value "::1" of the func field corresponding to SID1; and the second device obtains "2000::3" of the locator part based on Table 3 and the value "3" of the locator ID field corresponding to SID3 in the first message, and then obtains "2000::3::1" of SID3 based on the value "::1" of the func field corresponding to SID3.

In this embodiment of this application, because the length of the locator identifier is less than the length of the locator part, the length of the SID list is reduced, and the first message may carry a larger quantity of SID lists than in the conventional manner, thereby improving transmission efficiency.

For example, it is assumed that one SID list includes 10 SIDs, the locator part of each SID occupies 15 bytes, and the function part of each SID occupies one byte. If the locator part of each SID is replaced by a locator ID that occupies only four bytes, the length of one SID list is 14×10+16=156 bytes; and a message with a message length of 4K bytes can carry a maximum of 4K/156≈25 SID lists (it is assumed that the SID lists are of the same length). As mentioned above, only a maximum of 15 SID lists can be carried in the conventional manner. Therefore, the first message in this embodiment of this application can carry a larger quantity of SID lists than in the conventional manner, thereby reducing a risk that the message is truncated or not sent, and improving a success rate of message transmission.

Figure 9:
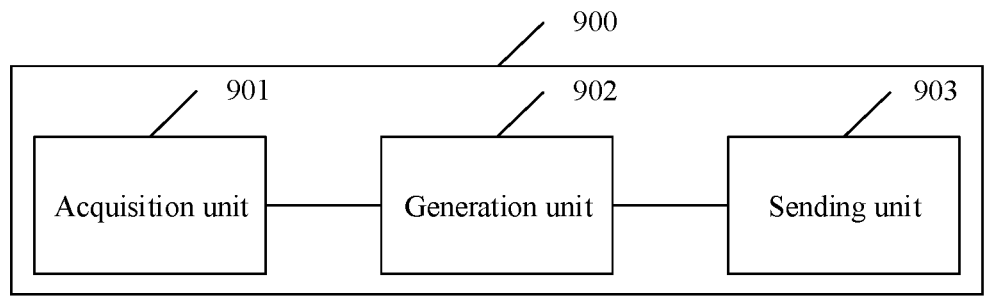
FIG. 9 is a schematic structural diagram of a message generation apparatus 900 according to an embodiment of this application.

Correspondingly, referring to FIG. 9, an embodiment of this application further provides a message generation apparatus 900. The apparatus 900 is configured to implement functions of the first device in the embodiment shown in FIG. 3. The apparatus 900 includes an acquisition unit 901, a generation unit 902, and a sending unit 903, where the acquisition unit 901 is configured to perform S101 in the embodiment shown in FIG. 3; the generation unit 902 is configured to perform S102 in the embodiment shown in FIG. 3; and the sending unit 903 is configured to perform S103 in the embodiment shown in FIG. 3.

The acquisition unit 901 is configured to obtain a segment identifier list SID list, where the SID list includes a plurality of segment identifiers SIDs, the first N bits of the plurality of SIDs are the same, and N is a positive integer.

The generation unit 902 is configured to generate a first message based on the SID list, where the first message includes a first part and a second part, the first part includes the first N bits of the plurality of SIDs, and the second part includes bit N+1 to bit 128 of each of the plurality of SIDs.

The sending unit 903 is configured to send the first message to a second device.

For related content of the message generation apparatus 900 provided in this embodiment of this application, reference may be made to the description of the first device in the embodiment shown in FIG. 3, and details are not described herein again.

Figure 10:
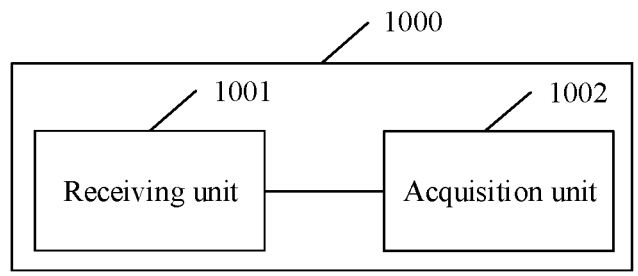
FIG. 10 is a schematic structural diagram of a message processing apparatus 1000 according to an embodiment of this application.

Referring to FIG. 10, an embodiment of this application provides a message processing apparatus 1000. The apparatus 1000 is configured to implement functions of the second device in the embodiment shown in FIG. 3. The apparatus 1000 includes a receiving unit 1001 and an acquisition unit 1002, where the receiving unit 1001 and the acquisition unit 1002 are configured to perform S104 in the embodiment shown in FIG. 3.

The receiving unit 1001 is configured to receive a first message from a first device, where the first message is used to carry a segment identifier list SID list, the SID list includes a plurality of segment identifiers SIDs, the first N bits of the plurality of SIDs are the same, the first message includes a first part and a second part, the first part includes the first N bits of the plurality of SIDs in the SID list, the second part includes bit N+1 to bit 128 of each of the plurality of SIDs.

The acquisition unit 1002 is configured to obtain the SID list based on the first part and the second part.

For related content of the message generation apparatus 1000 provided in this embodiment of this application, reference may be made to the description of the second device in the embodiment shown in FIG. 3, and details are not described herein again.

Figure 11:
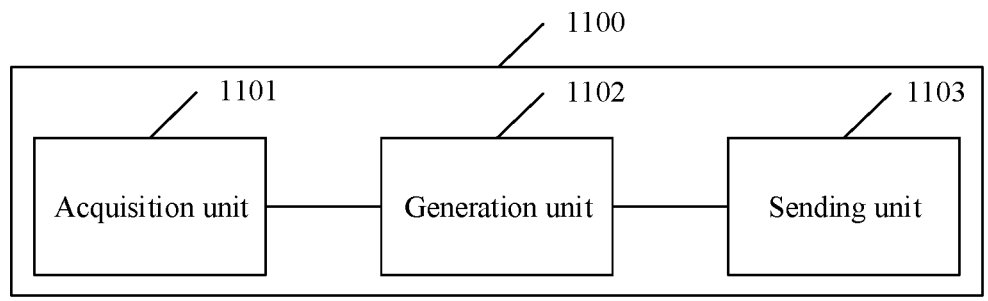
FIG. 11 is a schematic structural diagram of a message generation apparatus 1100 according to an embodiment of this application.

Referring to FIG. 11, an embodiment of this application provides a message generation apparatus 1100. The apparatus 1100 is configured to implement functions of the first device in the embodiment shown in FIG. 5. The apparatus 1100 includes an acquisition unit 1101, a generation unit 1102, and a sending unit 1103, where the acquisition unit 1101 is configured to perform S201 in the embodiment shown in FIG. 5; the generation unit 1102 is configured to perform S202 in the embodiment shown in FIG. 5; and the sending unit 1103 is configured to perform S203 in the embodiment shown in FIG. 5.

The acquisition unit 1101 is configured to obtain a segment identifier list SID list identifier, where the SID list identifier corresponds to an SID list.

The generation unit 1102 is configured to generate a first message, where the first message includes the SID list identifier.

The sending unit 1103 is configured to send the first message to a second device.

For related content of the message generation apparatus 1100 provided in this embodiment of this application, reference may be made to the description of the first device in the embodiment shown in FIG. 5, and details are not described herein again.

Figure 12:
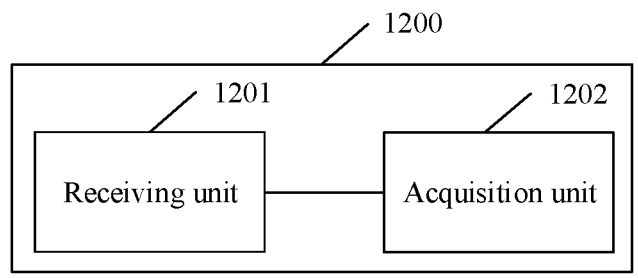
FIG. 12 is a schematic structural diagram of a message processing apparatus 1200 according to an embodiment of this application.

Referring to FIG. 12, an embodiment of this application provides a message processing apparatus 1200. The apparatus 1200 is configured to implement functions of the second device in the embodiment shown in FIG. 5. The apparatus 1200 includes a receiving unit 1201 and an acquisition unit 1202, where the receiving unit 1201 is configured to perform S204 in the embodiment shown in FIG. 5; and the acquisition unit 1202 is configured to perform S205 in the embodiment shown in FIG. 5.

The receiving unit 1201 is configured to receive a first message from a first device, where the first message includes a segment identifier list SID list identifier, and the SID list identifier corresponds to an SID list.

The acquisition unit 1202 is configured to obtain the SID list based on the SID list identifier and a correspondence, where the correspondence includes a correspondence between the SID list and the SID list identifier.

For related content of the message generation apparatus 1200 provided in this embodiment of this application, reference may be made to the description of the second device in the embodiment shown in FIG. 5, and details are not described herein again.

Figure 13:
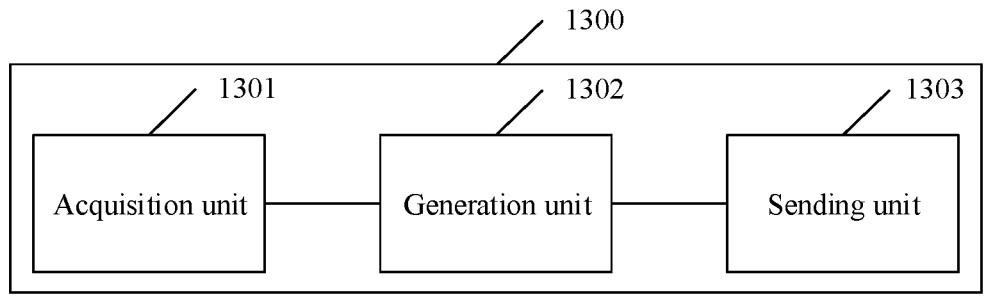
FIG. 13 is a schematic structural diagram of a message generation apparatus 1300 according to an embodiment of this application.

Referring to FIG. 13, an embodiment of this application provides a message generation apparatus 1300, where the apparatus 1300 is configured to implement functions of the first device in the embodiment shown in FIG. 7. The apparatus 1300 includes an acquisition unit 1301, a generation unit 1302, and a sending unit 1303, where the acquisition unit 1301 is configured to perform S301 in the embodiment shown in FIG. 7; the generation unit 1302 is configured to perform S302 in the embodiment shown in FIG. 7; and the sending unit 1303 is configured to perform S303 in the embodiment shown in FIG. 7.

The acquisition unit 1301 is configured to obtain a locator identifier corresponding to each segment identifier SID in a segment identifier list SID list, where the locator identifier is used to identify a locator part of an SID corresponding to the locator identifier, and a length of the locator identifier is less than a length of the locator part.

The generation unit 1302 is configured to generate a first message, where the first message includes a locator identifier corresponding to each SID in the SID list and a function part of each SID.

The sending unit 1303 is configured to send the first message to a second device.

For related content of the message generation apparatus 1300 provided in this embodiment of this application, reference may be made to the description of the first device in the embodiment shown in FIG. 7, and details are not described herein again.

Figure 14:
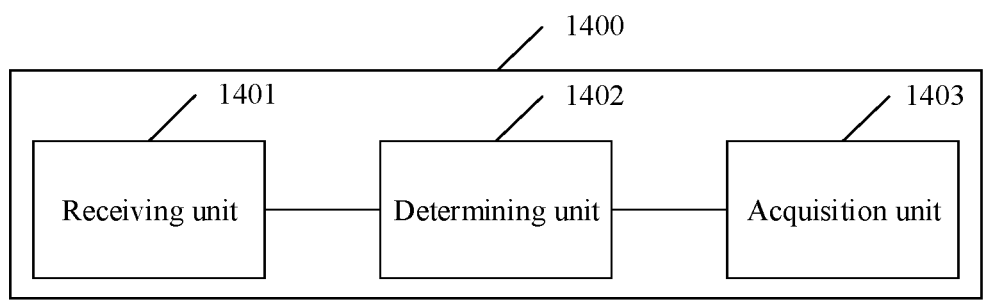
FIG. 14 is a schematic structural diagram of a message processing apparatus 1400 according to an embodiment of this application.

Referring to FIG. 14, an embodiment of this application provides a message processing apparatus 1400. The apparatus 1400 is configured to implement functions of the second device in the embodiment shown in FIG. 7. The apparatus 1400 includes a receiving unit 1401, a determining unit 1402, and an acquisition unit 1403, where the receiving unit 1401 is configured to perform S304 in the embodiment shown in FIG. 7; the determining unit 1402 is configured to perform S305 in the embodiment shown in FIG. 7; and the acquisition unit 1403 is configured to perform S306 in the embodiment shown in FIG. 7.

The receiving unit 1401 is configured to receive a first message from a first device, where the first message includes a locator identifier corresponding to each segment identifier SID in a segment identifier list SID list and a function part of the SID, the locator identifier is used to identify a locator part of an SID corresponding to the locator identifier, and a length of the locator identifier is less than a length of the locator part.

The determining unit 1402 is configured to obtain the locator part of each SID based on the locator identifier corresponding to each SID and a correspondence, where the correspondence includes a correspondence between the locator identifier and the locator part of each SID.

The acquisition unit 1403 is configured to obtain the SID list based on the locator part of each SID and the function part of each SID.

For related content of the message generation apparatus 1400 provided in this embodiment of this application, reference may be made to the description of the second device in the embodiment shown in FIG. 7, and details are not described herein again.

Figure 15:
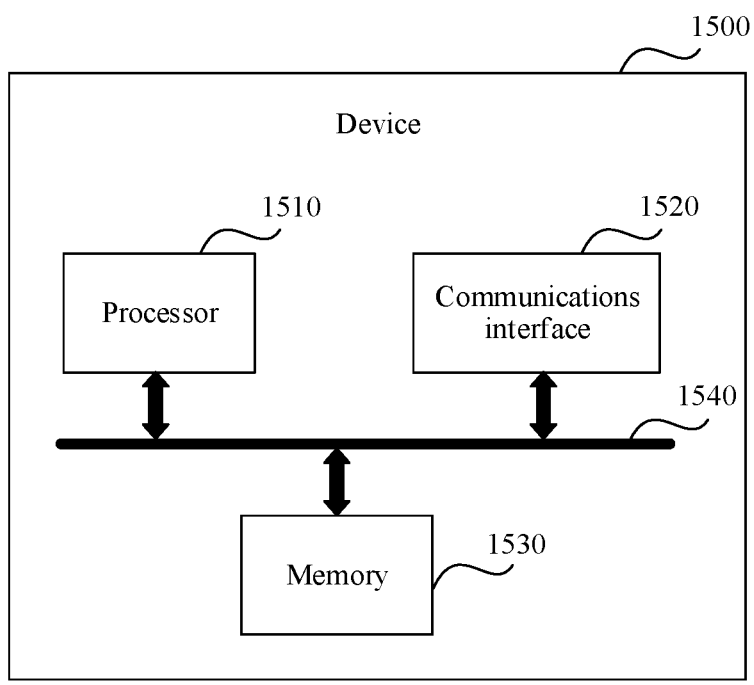
FIG. 15 is a schematic structural diagram of a device according to an embodiment of this application.

It should be noted that a hardware structure of a message generation device corresponding to the message generation apparatus 900, the message generation apparatus 1100, and the message generation apparatus 1300, and a hardware structure of a message processing device corresponding to the message processing apparatus 1000, the message processing apparatus 1200, and the message processing apparatus 1400 may be both the structure shown in FIG. 15. FIG. 15 is a schematic structural diagram of a device according to an embodiment of this application.

As shown in FIG. 15, the device 1500 includes a processor 1510, a communications interface 1520, and a memory 1530. The device 1500 may include one or more processors 1510. In FIG. 15, one processor is used as an example. In this embodiment of this application, the processor 1510, the communications interface 1520, and the memory 1530 may be connected using a bus system or another method. In FIG. 15, a connection based on a bus system 1040 is used as an example.

The processor 1510 may be a central processing unit (central processing unit, CPU), a network processor (network processor, NP), or a combination of a CPU and an NP. The processor 1510 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL), or any combination thereof.

The memory 1530 may include a volatile memory (English: volatile memory), such as a random-access memory (random-access memory, RAM). The memory 1530 may also include a non-volatile memory (English: non-volatile memory), such as a flash memory (English: flash memory), a hard disk drive (hard disk drive, HDD), or a solid-state drive (solid-state drive, SSD). The memory 1530 may also include a combination of memories of the foregoing types.

Optionally, the memory 1530 stores an operating system and a program, an executable module or a data structure, or a subset thereof, or an extended set thereof, where the program may include various operation instructions for implementing various operations. The operating system may include various system programs for implementing various basic services and processing hardware-based tasks. The processor 1510 may read the program in the memory 1530 to implement the message generation method or the message processing method provided in the embodiments of this application.

The bus system 1040 may be a peripheral component interconnect (peripheral component interconnect, PCI) bus, an extended industry standard architecture (extended industry standard architecture, EISA) bus, or the like. The bus system 1040 may be classified into an address bus, a data bus, a control bus, and the like. For ease of representation, only one thick line is used to represent the bus in FIG. 15, but this does not mean that there is only one bus or only one type of bus.

An embodiment of this application further provides a message generation system, where the system includes a first device and a second device. The first device in the system may perform processing steps of the first device in the embodiment shown in FIG. 3, or correspondingly, the first device in the system is the message generation apparatus 900 in the embodiment shown in FIG. 9. The second device in the system may perform processing steps of the second device in the embodiment shown in FIG. 3, or correspondingly, the second device in the system is the message processing apparatus 1000 in the embodiment shown in FIG. 10.

An embodiment of this application further provides a message generation system, where the system includes a first device and a second device. The first device in the system may perform processing steps of the first device in the embodiment shown in FIG. 5, or correspondingly, the first device in the system is the message generation apparatus 1100 in the embodiment shown in FIG. 11. The second device in the system may perform processing steps of the second device in the embodiment shown in FIG. 5, or correspondingly, the second device in the system is the message processing apparatus 1200 in the embodiment shown in FIG. 12.

An embodiment of this application further provides a message generation system, where the system includes a first device and a second device. The first device in the system may perform processing steps of the first device in the embodiment shown in FIG. 7, or correspondingly, the first device in the system is the message generation apparatus 1300 in the embodiment shown in FIG. 13. The second device in the system may perform processing steps of the second device in the embodiment shown in FIG. 7, or correspondingly, the second device in the system is the message processing apparatus 1400 in the embodiment shown in FIG. 14.

An embodiment of this application further provides a computer-readable storage medium, where the computer-readable storage medium includes an instruction, and when the instruction is run on a computer, the computer is enabled to perform the message generation method that is provided in the foregoing method embodiments and that is performed by the first device.

An embodiment of this application further provides a computer-readable storage medium, where the computer-readable storage medium includes an instruction, and when the instruction is run on a computer, the computer is enabled to perform the message processing method that is provided in the foregoing method embodiments and that is performed by the second device.

An embodiment of this application further provides a computer program product including an instruction, where when the computer program product runs on a computer, the computer is enabled to perform the message generation method that is provided in the foregoing method embodiments and that is performed by the first device.

An embodiment of this application further provides a computer program product including an instruction, where when the computer program product runs on a computer, the computer is enabled to perform the message processing method that is provided in the foregoing method embodiments and that is performed by the second device.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present application described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In this application, "at least one" means one or more, and "a plurality of" means two or more. "At least one of the following" or a similar expression thereof indicates any combination of the following, and includes any combination of one or more of the following. For example, at least one of a, b, or c may indicate: a, b, c, a-b, a-c, b-c, or a-b-c, where a, b, and c may indicate a singular or plural form. In this application, "A and/or B" is considered to include A alone, B alone, and A+B.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may include a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Persons skilled in the art should be aware that in the foregoing one or more examples, functions described in the present application may be implemented by hardware, software, firmware, or any combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the present application have been described in further detail in the foregoing specific implementations. It should be understood that the foregoing descriptions are merely specific implementations of the present application.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A message generation method, wherein the method comprises:
    obtaining, by a first device, a segment identifier list (SID list), wherein the SID list comprises a plurality of segment identifiers (SIDs), the first N bits of the plurality of SIDs are the same, and N is a positive integer;
    generating, by the first device, a first message based on the SID list, wherein the first message comprises a first part and a second part, the first part comprises the first N bits of the plurality of SIDs, and the second part comprises bit N+1 to bit 128 of each of the plurality of SIDs; and
    sending, by the first device, the first message to a second device, wherein the first message is a Border Gateway Protocol (BGP) message, and the sending, by the first device, of the first message to the second device enables the second device to obtain the SID list based on the first part and the second part.

2. The method according to claim 1, wherein the second part further comprises a position indicator indicating a position of the first N bits of the plurality of SIDs in the first part.

3. The method according to claim 1, wherein the first part further comprises a length of the first N bits.

4. The method according to claim 1, wherein the first device is a controller, and the second device is a network forwarding device; and the method further comprises:
receiving, by the first device, segment description information of at least one of the plurality of SIDs from the second device.

5. The method according to claim 1, wherein the first device is a network forwarding device, the second device is a controller, and the first message further comprises segment description information of at least one of the plurality of SIDs.

6. A message processing method, wherein the method comprises:
receiving, by a second device, a first message from a first device, wherein the first message is used to carry a segment identifier list (SID list), the SID list comprises a plurality of segment identifiers (SIDs), the first N bits of the plurality of SIDs are the same, the first message comprises a first part and a second part, the first part comprises the first N bits of the plurality of SIDs, the second part comprises bit N+1 to bit 128 of each of the plurality of SIDs, and N is a positive integer, wherein the first message is a Border Gateway Protocol (BGP) message; and
obtaining, by the second device, the SID list based on the first part and the second part.

7. The method according to claim 6, wherein the second part further comprises a position indicator indicating a position of the first N bits of the plurality of SIDs in the first part; and
the obtaining, by the second device, the SID list based on the first part and the second part comprises:
obtaining, by the second device, the first N bits of the plurality of SIDs based on the position indicator; and
obtaining, by the second device, the SID list based on the first N bits of the plurality of SIDs and bit N+1 to bit 128 of each of the plurality of SIDs.

8. The method according to claim 6, wherein the first part further comprises a length of the first N bits.

9. The method according to claim 6, wherein the first device is a controller, the second device is a network forwarding device, and the first message further comprises segment description information of at least one of the plurality of SIDs.

10. The method according to claim 6, wherein the first device is a network forwarding device, and the second device is a controller; and
the method further comprises:
receiving, by the first device, segment description information of at least one of the plurality of SIDs from the second device.

11. A message generation apparatus, wherein the apparatus comprises:
at least one processor; and
one or more memories coupled to the at least one processor and storing instructions for execution by the at least one processor, the instructions instruct the at least one processor to cause the apparatus to:
obtain a segment identifier list (SID list), wherein the SID list comprises a plurality of segment identifiers (SIDs), the first N bits of the plurality of SIDs are the same, and N is a positive integer;
generate a first message based on the SID list, wherein the first message comprises a first part and a second part, the first part comprises the first N bits of the plurality of SIDs, and the second part comprises bit N+1 to bit 128 of each of the plurality of SIDs;
send the first message to a second device, wherein the first message is a Border Gateway Protocol (BGP) message; and
the apparatus is caused to send the first message to the second device to enable the second device to obtain the SID list based on the first pail and the second part.

12. The apparatus according to claim 11, wherein the second part further comprises a position indicator indicating a position of the first N bits of the plurality of SIDs in the first part.

13. The apparatus according to claim 11, wherein the first part further comprises a length of the first N bits.

14. The apparatus according to claim 11, wherein the apparatus is applied to a network forwarding device, the second device is a controller, and the first message further comprises segment description information of at least one of the plurality of SIDs.

15. A message processing apparatus, wherein the apparatus comprises:
at least one processor; and
one or more memories coupled to the at least one processor and storing instructions for execution by the at least one processor, the instructions instruct the at least one processor to cause the apparatus to:
receive a first message from a first device, wherein the first message is used to carry a segment identifier list (SID list), the SID list comprises a plurality of segment identifiers (SIDs), the first N bits of the plurality of SIDs are the same, the first message comprises a first part and a second part, the first part comprises the first N bits of the plurality of SIDs, the second part comprises bit N+1 to bit 128 of each of the plurality of SIDs, and N is a positive integer, wherein the first message is a Border Gateway Protocol (BGP) message; and
obtain the SID list based on the first part and the second part.

16. The apparatus according to claim 15, wherein the second part further comprises a position indicator indicating a position of the first N bits of the plurality of SIDs in the first part; and the instructions further instruct the at least one processor to cause the apparatus to:
obtain the first N bits of the plurality of SIDs based on the position indicator; and obtain the SID list based on the first N bits of the plurality of SIDs and bit N+1 to bit 128 of each of the plurality of SIDs.

17. The apparatus according to claim 15, wherein the first part further comprises a length of the first N bits.

18. The apparatus according to claim 15, wherein the first device is a controller, the apparatus is applied to a network forwarding device, and the first message further comprises segment description information of at least one of the plurality of SIDs.

* * * * *